(12) United States Patent
Takashima et al.

(10) Patent No.: US 6,733,853 B2
(45) Date of Patent: May 11, 2004

(54) POLYESTER-BASED RESIN COMPOSITION AND SHAPED ARTICLES

(75) Inventors: Masahiko Takashima, Hiratsuka (JP); Koji Yamamoto, Hiratsuka (JP); Hiroyuki Nanba, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 102 days.

(21) Appl. No.: 10/081,217

(22) Filed: Feb. 25, 2002

(65) Prior Publication Data

US 2002/0165326 A1 Nov. 7, 2002

(30) Foreign Application Priority Data

Mar. 5, 2001 (JP) .................................... 2001-060053

(51) Int. Cl.$^7$ ............................................. C08L 77/00
(52) U.S. Cl. .................. 428/35.7; 428/220; 428/474.4; 428/475.5; 525/425
(58) Field of Search .................... 525/525; 428/35.7, 428/220, 474.4, 475.5

(56) References Cited

U.S. PATENT DOCUMENTS

| 5,340,884 A | | 8/1994 | Mills et al. | |
| 6,103,857 A | * | 8/2000 | Jones et al. | ................. 528/272 |
| 6,444,283 B1 | * | 9/2002 | Turner et al. | ............... 428/35.7 |

FOREIGN PATENT DOCUMENTS

| EP | 0301719 | 2/1989 |
| EP | 0964031 | 12/1999 |
| EP | 1046674 | 10/2000 |
| EP | 1182228 | 2/2002 |
| WO | 0109245 | 2/2001 |

OTHER PUBLICATIONS

Patent Abstract of Japan, Publication No.: 58160344; Publication Date: Sep. 22, 1983; Application Date: Mar. 17, 1982; Application No.: 57043429; Applicant: Toyobo Co., Ltd.; Inventor: Akashi Tatsu; Hollow Polyester Molding Having Excellent Gas Barrier Properties.

Patent Abstracts of Japan, Publication No.: 62181336; Publication Date: Aug. 8, 1987; Application Date: Feb. 6, 1986; Application No.: 61024483; Applicant: Yoshino Kogyosho Co., Ltd.; Inventor: Koshio Shuchi; Molded Article of Polyethylene Terephthalate Resin.

Patent Abstracts of Japan, Publication No.: 01320159; Publication Date: Dec. 26, 1989; Application No.: Jun. 21, 1988; Application No.: 63153325; Applicant: Mitsubishi Kasei Corp.; Inventor: Takamiya Naoki; Laminated and Oriented Molding.

* cited by examiner

*Primary Examiner*—Ana L. Woodward
(74) *Attorney, Agent, or Firm*—Antonelli, Terry, Stout & Kraus, LLP

(57) ABSTRACT

The polyester-based resin composition of the present invention comprises a melt blend (C) consisting of a polyamide resin (A) and a polyester resin (B). The polyester-based resin composition satisfies the following formulas 1 and 2:

$$P \times C/100 \leq 25 \quad (1)$$

$$Y/X \times 100 \geq 90 \quad (2)$$

wherein P is a concentration, ppm, of a phosphorus compound in the polyamide resin (A) in terms of phosphorus atom; C is a content, % by mass, of the polyamide resin (A) in the melt blend (C); X is a lightness of a 2-mm thick plate which is molded only from the polyester resin (B); and Y is a lightness of a 2-mm thick plate which is molded from the melt blend (C). By regulating the phosphorus concentration and the polyamide resin (A) content so as to meet the limitation of formula 1, the polyester-based resin composition and a shaped article or packaging container made thereof are effectively prevented from the darkening due to the deposition of antimony metal despite the blending of a polyamide resin, thereby attaining a high clearness as defined by formula 2.

18 Claims, No Drawings

POLYESTER-BASED RESIN COMPOSITION AND SHAPED ARTICLES

BACKGROUND OF THE INVENTION

1. Field of the Invention

The present invention relates to a resin composition comprising a polyamide resin and a polyester resin, a shaped article and a packaging container made of the resin composition. More specifically, the present invention relates to a resin composition produced by melt-blending a specific polyamide resin containing a phosphorus compound and a polyester resin containing an antimony compound, the resin composition being improved in gas barrier properties insufficient in resin compositions containing only a polyester resin and being eliminated in the problem of a darkened appearance due to the blend of a polyamide resin that lies in conventional resin compositions. The present invention also relates to a shaped article and a packaging container made of such a resin composition.

2. Description of the Prior Art

A polyester resin represented by a polymer, such as poly(ethylene terephthalate), which is prepared using an aromatic dicarboxylic acid and an aliphatic diol as monomers (hereinafter referred to as "polyester resin") has been now widely used as packaging materials such as films, sheets and hollow containers because of its excellency in clearness, mechanical properties, melt stability, solvent resistance, flavor retention, recycling ability, etc. In spite of such excellent properties, the application field of packaging containers made of a polyester resin is limited because the polyester resin is not always sufficient in gas barrier properties against oxygen, carbon dioxide, etc. Improvement of the gas barrier properties of polyester resin has been attempted by vapor depositing aluminum oxide or silicon oxide onto a shaped article or packaging container made of a polyester resin, or by coating or laminating a resin having gas barrier properties higher than that of a polyester resin onto a shaped article or packaging container made of a polyester resin. However, since a complicated product process is required and the recycling ability or mechanical properties are detracted, these methods have been used in limited fields.

As an alternative method for improving the gas barrier properties of polyester resin which is free from the above problems, cited is a melt blending of a thermoplastic resin having high gas barrier properties with a polyester resin. An ethylene-vinyl alcohol copolymer resin can be mentioned as an example for such a high gas barrier resin. However, the ethylene-vinyl alcohol copolymer resin is little compatible with a polyester resin because of its molecular structure to give a white cloudy resin composition when blended with a polyester resin, thereby spoiling the clearness that is one of the beneficial characteristics of a polyester resin. In addition, since the ethylene-vinyl alcohol copolymer resin is relatively high in crystallizability as compared with a polyester resin, the stretchability of polyester resin tends to be lowered, this making the resin blend inapplicable to the production of packaging containers such as biaxially stretched films and blown bottles because a stretching process is indispensable. Further, the ethylene-vinyl alcohol copolymer resin is susceptible to a rapid thermal degradation at an optimum processing temperature for a polyester resin. Thus, the blend of the ethylene-vinyl alcohol copolymer resin raises another problem of reducing the processing stability of polyester resin.

Gas barrier resins other than the ethylene-vinyl alcohol copolymer include polyamide resins represented by Nylon 6, Nylon 66, etc. Of the polyamide resins, poly(m-xylylene diadipamide) prepared by the polymerization of a diamine component mainly comprising m-xylylene diamine and a dicarboxylic acid component mainly comprising adipic acid is particularly excellent in the gas barrier properties. In addition to its high gas barrier properties as compared with those of other polyamide resins, poly(m-xylylene diadipamide) does not detract the processing stability of polyester resin because its glass transition temperature, melting point and crystallizability are close to those of a poly(ethylene terephthalate) which is a typical polyester resin being in extremely wide use. Therefore, poly(m-xylylene diadipamide) is quite suitable for improving the gas barrier properties of polyester resin. A commercially available poly(m-xylylene diadipamide), for example, MX Nylon (product name) of Mitsubishi Gas Chemical Company, Inc., contains a phosphorus compound in an amount of several hundred ppm in terms of phosphorus atom to prevent the coloring of the resin during the melt processing.

The production of polyester resin is generally carried out in the presence of a metal catalyst containing germanium atom or antimony atom to increase the polymerization rate of monomers. It has been known in the art that a shaped article made of a polyester resin that is produced using an antimony-bearing catalyst is slightly darkened because of the deposition of metallic antimony by the reduction of an antimony compound. Therefore, to avoid the decrease of the commercial value of shaped article, the darkening is prevented by limiting the use amount of the antimony compound. Even in the case of using a limited amount of the antimony compound, if a shaped article is produced by melt-kneading and molding a polyester resin blended with poly(m-xylylene diadipamide) to improve the gas barrier properties, the darkening of the shaped article is considerably enhanced, as compared with a shaped article from a polyester resin added with no poly(m-xylylene diadipamide), because of the deposition of metallic antimony promoted by a phosphorus compound in poly(m-xylylene diadipamide). Therefore, the commercial value is reduced much when the shaped article is used as packaging materials or packaging containers for foodstuffs, etc., where the appearance is of extreme importance.

In Japanese Patent Publication No. 4-54702, is proposed a hollow shaped article excellent in gas barrier properties which is made of a resin composition containing a thermoplastic polyester resin mainly constituted by ethylene terephthalate repeating units and a polyamide resin. This document merely proposes to improve the gas barrier properties by incorporating a polyamide resin, and is quite silent as to the problem addressed in the present invention, i.e., the prevention of darkening of shaped articles by the action of phosphorus atom in a polyamide resin. Japanese Patent Publication No.6-78094 proposes a method of producing a heat-resistant synthetic resin bottle from a poly(ethylene terephthalate) resin blended with a nylon mainly constituted by m-xylylene diamine and adipic acid. This document relates to the improvement of the production method of heat-resistant bottles, and there is nothing about the prevention of darkening of shaped articles by the action of phosphorus atom in a polyamide resin.

SUMMARY OF THE INVENTION

A first object of the present invention is to solve the above problems and provide a resin composition excellent in gas barrier properties and reduced in the darkening, which comprises a polyester resin prepared using an antimony compound as a catalyst and a specific polyamide resin containing a phosphorus compound.

Another object of the present invention is to provide a shaped article and a packaging container made of such a resin composition.

As a result of extensive study in view of solving the above problems, the inventors have found that the increase in the darkening of a resin composition comprising a polyester resin prepared using an antimony compound as a catalyst and a polyamide resin can be prevented by regulating a relationship between a concentration of phosphorus atom derived from a phosphorus compound in the polyamide resin and a blending amount of the polyamide resin within a limited range, thereby obtaining a polyester-based resin composition with improved gas barrier properties.

Thus, the present invention relates to a polyester-based resin composition comprising a melt blend (C) consisting of 3 to 40% by mass of a polyamide resin (A) which is prepared by a polycondensation of a diamine component containing 70 mol % or more of m-xylylene diamine and a dicarboxylic acid component containing 70 mol % or more of adipic acid and 97 to 60% by mass of a polyester resin (B) which contains an antimony compound used as a polycondensation catalyst in an amount of 50 to 400 ppm in terms of antimony atom, the polyester-based resin composition satisfying the following formulas 1 and 2:

$$P \times C/100 \leq 25 \tag{1}$$

$$Y/X \times 100 \geq 90 \tag{2}$$

wherein P is a concentration, ppm, of a phosphorus compound in the polyamide resin (A) in terms of phosphorus atom; C is a content, % by mass, of the polyamide resin (A) in the melt blend (C); X is a lightness of a 2-mm thick plate which is molded only from the polyester resin (B); and Y is a lightness of a 2-mm thick plate which is molded from the melt blend (C).

The present invention further relates to a shaped article and a packaging container made of the polyester-based resin composition.

The term "ppm" referred to herein means "ppm by mass."

DETAILED DESCRIPTION OF THE INVENTION

The present invention will be described below in more detail.

The polyester resin (B) is prepared by polycondensing a dicarboxylic acid component mainly comprising an aromatic dicarboxylic acid and a diol component mainly comprising an aliphatic diol. Examples of the dicarboxylic acid component include terephthalic acid, isophthalic acid, a naphthalenedicarboxylic acid such as 2,6-naphthalenedicarboxylic acid, 1,5-naphthalenedicarboxylic acid and 2,7-naphthalenedicarboxylic acid, 4,4'-biphenyldicarboxylic acid, 3,4'-biphenyldicarboxylic acid, and ester-forming derivatives of the preceding dicarboxylic acids, with terephthalic acid and isophthalic acid being preferred. When terephthalic acid is used, the proportion of terephthalic acid in the dicarboxylic acid component is 70 mol % or more, preferably 80 mol % or more, and more preferably 90 mol % or more. When isophthalic acid is used in addition to terephthalic acid, the proportion of isophthalic acid is 1 to 10 mol %, preferably 1 to 8 mol %, and more preferably 1 to 6 mol % based on the total of the dicarboxylic acid component. The use of isophthalic acid in the proportion mentioned above lowers the crystallization speed of a resulting copolyester resin to improve the moldability. As another dicarboxylic acid component, usable are an aliphatic dicarboxylic acid such as adipic acid, azelaic acid and sebacic acid; a monocarboxylic acid such as benzoic acid, propionic acid and butyric acid; a polybasic carboxylic acid such as trimellitic acid and pyromellitic acid; and a carboxylic anhydride such as trimellitic anhydride and pyromellitic anhydride. These acids may be used in an amount not adversely affecting the effect of the present invention.

Examples of the diol component of the polyester resin (B) include ethylene glycol, 1,3-propylene glycol, 1,4-butandiol, 1,4-cyclohexane dimethanol, 1,6-hexanediol, and ester-forming derivatives of the preceding diols, with ethylene glycol being preferred. The proportion of ethylene glycol in the diol component is 70 mol % or more, preferably 80 mol % or more, and more preferably 90 mol % or more. As another diol component, usable are a monohydric alcohol such as butyl alcohol, hexyl alcohol and octyl alcohol; a polyhydric alcohol such as trimethylolpropane, glycerol and pentaerythritol; and cyclic acetals. These diols may be used in an amount not adversely affecting the effect of the present invention.

The polyester resin (B) may be produced by a known method such as a direct esterification method and an ester-exchanging method. The production of polyester resin is generally carried out by using a polycondensation catalyst, for example, an antimony compound such as antimony trioxide and antimony pentoxide and a germanium compound such as germanium oxide. The effect of the present invention to reduce the darkening of the polyester-based resin composition and a shaped article and packaging container made thereof is applicable to a polyester resin prepared by using an antimony compound as a catalyst.

The concentration of the antimony compound used as the catalyst for preparing the polyester resin (B) is, in terms of antimony atom, 50 to 400 ppm, preferably 70 to 350 ppm, and more preferably 100 to 300 ppm. When the antimony concentration (concentration in terms of antimony atom) is 50 ppm or more, the polycondensation for preparing a polyester resin proceeds quickly to prevent the production of by-product and shorten the reaction time, this making the process industrially quite advantageous. When the antimony concentration is 400 ppm or less, the deposition of metallic antimony due to the reduction of antimony compound is prevented, namely, the darkening of the polyester resin is prevented to enhance the commercial value of shaped articles which are produced by such a polyester resin.

Polyester resins preferably used in the present invention may include poly(ethylene terephthalate) resin, ethylene-terephthalate-isophthalate copolymer resin, ethylene-1,4-cyclohexane dimethylene-terephthalate copolymer resin, poly(ethylene 2,6-naphthalenedicarboxylate) resin, ethylene-2,6-naphthalenedicarboxylate-terephthalate copolymer resin, and ethylene-terephthalate-4,4'-biphenyldicarboxylate copolymer resin, with poly(ethylene terephthalate) resin and ethylene-terephthalate-isophthalate copolymer resin being particularly preferred.

Prior to molding or forming, it is preferred to dry the polyester resin (B) so as to have a moisture content of 200 ppm or less, preferably 100 ppm or less, and more preferably 50 ppm or less. The intrinsic viscosity of the polyester resin (B) is not particularly limited, and preferably 0.5 to 2.0 dl/g, more preferably 0.6 to 1.8 dl/g when measured in a phenol/1,1,2,2-tetrachloroethane (60/40 by mass) mixed solvent at 25° C. A polyester resin having an intrinsic viscosity of 0.5 dl/g or more has a sufficiently high molecular weight. Therefore, a shaped article or a packaging container made of a polyester-based resin composition containing such a polyester exhibits sufficient mechanical properties required for structured bodies.

The polyamide resin (A) is a polyamide prepared by the polymerization of a diamine component containing 70 mol % or more of m-xylylene diamine and a dicarboxylic acid component containing 70 mol % or more of adipic acid. Preferably, the polyamide resin (A) is constituted by 90 mol % or more of m-xylylene diamine-adipic acid repeating units. A polyamide having the above monomer composition and the above structural unit is advantageous, because it is similar to a polyester resin such as poly(ethylene terephthalate) in the processing characteristics thereby not to impair the processing characteristics of the polyester-based resin composition.

The diamine component constituting the polyamide resin (A) is required to contain 70 mol % or more, preferably 90 mol % or more, of m-xylylene diamine. A polyamide resin produced from a diamine component containing 70 mol % or more of m-xylylene diamine shows excellent gas barrier properties. Examples of the diamine component other than m-xylylene diamine include, but not limited to, p-xylylene diamine, 1,3-bis(aminomethyl)cyclohexane, 1,4-bis (aminomethyl)cyclohexane, tetramethylene diamine, hexamethylene diamine, nonamethylnene diamine, and 2-methyl-1,5-pentane diamine.

The dicarboxylic acid component constituting the polyamide resin (A) is required to contain 70 mol % or more, preferably 90 mol % of more, of adipic acid. When the dicarboxylic acid component contains 70 mol % or more of adipic acid, the decrease of gas barrier properties and the excessive decrease of crystallizability can be avoided. Examples of the dicarboxylic acid component other than adipic acid include, but not limited to, suberic acid, azelaic acid, sebacic acid, 1,10-decane dicarboxylic acid, terephthalic acid, isophthalic acid and 2,6-naphthalene dicarboxylic acid. In addition, a small amount of a monoamine or a monocarboxylic acid may be added as a molecular weight modifier during the polycondensation for producing the polyamide resin (A).

The polyamide resin (A) is prepared by a melt polycondensation method. For example, a nylon salt of m-xylylene diamine and adipic acid is heated under pressure in the presence of water to melt-polymerize m-xylylene diamine and adipic acid in molten state while removing water initially added and condensation water being produced. Alternatively, the polycondensation is carried out under ordinary pressure by directly adding m-xylylene diamine to a molten adipic acid. In this method, the polycondensation is carried out by continuously adding m-xylylene diamine to adipic acid to maintain the reaction system uniform liquid state while heating the reaction system so as to avoid the reaction temperature from being lowered below the melting point of oligoamide or polyamide being produced.

The polyamide resin (A) usually contains a phosphorus compound which is used to enhance the processing stability during the melt molding or prevent the coloring of the polyamide resin. The phosphorus compound being preferably used is an alkali metal- or alkaline earth metal-containing phosphorus compound. Examples thereof include phosphates, hypophosphites and phosphites of sodium, magnesium or calcium. As the polyamide resin (A) used in the present invention, a polyamide prepared using a hypophosphite of an alkali metal or an alkaline earth metal is preferably used because of its excellent effect on preventing the coloring of polyamide. In the present invention, the concentration of the phosphorus compound in the polyamide resin (A) is 200 ppm or less, preferably 160 ppm or less, and more preferably 100 ppm or less in terms of phosphorus atom. If the phosphorus atom concentration in the polyamide resin (A) exceeds 200 ppm, the prevention of darkening and the improvement of gas barrier properties of the polyester-based resin composition cannot be obtained simultaneously to result in the decrease of the commercial value of a shaped article and a packaging container made thereof.

The relative viscosity of the polyamide resin (A) is preferably 1.83 to 4.20, more preferably 2.02 to 4.20, and most preferably 2.30 to 4.20 when measured at 25° C. as a solution prepared by dissolving 1 g of polyamide resin in 100 ml of a 96% sulfuric acid. If the relative viscosity is 1.80 or less, uneven melting caused by instable fluidity of a molten resin becomes remarkable during the molding process of a polyester-based resin composition, thereby decreasing the commercial value of a shaped article and a packaging container. Since the relative viscosity of the polyamide resin (A) is 1.83 or more, the polyester-based resin composition of the present invention is extremely improved in its moldability.

Prior to molding or forming, it is preferred to dry the polyamide resin (A) so as to have a moisture content of 0.10% by mass or less, preferably 0.08% by mass or less, and more preferably 0.05% by mass or less. The dry operation may be carried out by a known method, for example, by a method where a polyamide resin is melt-extruded from a vented extruder while evacuating a cylinder by a vacuum pump to remove the moisture or by a method where a polyamide resin is dried by heating in a tumbler (rotary vacuum drum) at a temperature lower than its melting point under reduced pressure, although not limited thereto.

The melt blend (C) is prepared by melt-blending the polyamide resin (A) and the polyester resin (B) that is so controlled as to contain the antimony compound in a concentration of 50 to 400 ppm in terms of antimony atom. The content of the polyamide resin (A) is preferably 3 to 40% by mass, more preferably 5 to 35% by mass in view of improving the gas barrier properties and stabilizing the moldability (the combined amounts of the polyamide resin (A) and the polyester resin (B) total 100% by mass). If the polyamide resin (A) contains a phosphorus compound, the antimony compound in the polyester resin (B) is likely to deposit as metallic antimony to cause the darkening. Therefore, in the present invention, in addition to restricting the content of the polyamide resin (A) within the above range, the concentration of the phosphorus compound in the polyamide resin (A) should be limited to a predetermined level or lower. Namely, the content of the polyamide resin (A) and the concentration of the phosphorus compound therein are regulated so as to meet the following formula 1:

$$P \times C/100 \leq 25 \quad (1)$$

wherein P is the concentration (ppm) of the phosphorus compound in the polyamide resin (A) in terms of phosphorus atom and C is the content (% by mass) of the polyamide resin (A) based on the total amount of the polyamide resin (A) and the polyester resin (B). The value of P×C/100 is preferably 20 or less, and more preferably 17 or less. By regulating the content of the polyamide resin (A) and the concentration of the phosphorus compound therein so that the value of the formula 1 falls within the range of 25 or less, the polyester-based resin composition having improved gas barrier properties with little darkening due to the deposition of metallic antimony can be obtained.

The polyester-based resin composition of the present invention is required to meet the following formula 2:

$$Y/X \times 100 \geq 90 \qquad (2)$$

wherein X is a lightness of a 2-mm thick plate molded only from a polyester resin (B) which constitutes the melt blend (C) and Y is a lightness of a 2-mm thick plate molded from the melt blend (C). The value of Y/X×100 is preferably 92 or more, and more preferably 95 or more. The lightness referred to herein means the lightness (L value) determined by a transmission measurement according to JIS K7105, and the smaller the lightness, the larger the extent of darkening. If the value of Y/X×100 is less than 90, the darkening due to blending the polyamide resin (A) becomes severe to unfavorably give a shaped article and a packaging container having a darkened appearance.

In addition to the melt blend (C), the polyester-based resin composition of the present invention may further contain another resin in an amount not adversely affecting the effect of the present invention. Examples of the additional resin include a polyester resin other than the polyester resin (B) such as poly(ethylene naphthalate) and poly(butylene terephthalate); a polyamide resin other than the polyamide resin (A) such as nylon 6 and nylon 66; and a polyolefin such as polyethylene and polypropylene. In addition, a recycled resin of polyester resin, polyamide resin, a mixture thereof or a melt blend thereof may be blended in an amount not adversely affecting the effect of the present invention. Additives known in the art may be also blended, which may be pigment, dye, lubricant, delustering agent, heat stabilizer, weathering agent, UV absorber, nucleating agent, plasticizer, fire retardant, antistatic agent, alkali compound for preventing gelation of polyamide resin, etc.

The shaped article or packaging container of the present invention has at least one layer made of the polyester-based resin composition. The shaped article and packaging container may include a film; a packaging bag or cap made of the film; a sheet; a cup, tray, bottle or tube made of the sheet; etc. The wall of the shaped article and packaging container may be a single layer of the polyester-based resin composition or a multi-layered structure laminated with another resin layer.

Examples of the multi-layered shaped article or packaging container include a bottle made of a multi-layered laminate comprising alternately stacked poly(ethylene terephthalate) layers and polyester-based resin composition layers; a sheet having a multi-laminated structure comprising, from the inner side, polyolefin (such as polyethylene and polypropylene) layer/adhesive polyolefin layer/polyester-based resin composition layer/adhesive polyolefin layer/polyolefin, and packaging containers such as tray and cup made of the sheet; and a film having a multi-layered structure comprising polyolefin layer/adhesive resin layer/polyester-based resin composition layer, and packaging bags made of the film. The polyester-based resin composition of the present invention can be applied to shaped articles and packaging containers having other multi-layered structures without limited to the above specific examples.

The shaped article and the packaging container made of the polyester-based resin composition shows, because the highly gas barrier polyamide resin (A) is blended, gas barrier properties higher than those of a shaped article made only of the polyester resin (B), thereby enhancing the preservation quality of products being stored therein. To provide the shaped article and the packaging container with sufficient gas barrier properties, the thickness of the layer made of the polyester-based resin composition is preferably 0.003 to 5 mm, and more preferably 0.01 to 4.5 mm.

A marked effect of the polyester-based resin composition of the present invention is obtained when it is molded into a shaped article such as bottle which has a portion having a thickness of 2 mm or more, for example, a bottom portion and a mouthpiece portion. If a shaped article such as bottle is molded from a resin material with a remarkable darkening due to the deposition of antimony, the thick portion such as the bottom portion and the mouthpiece portion presents a darkened appearance, this drastically reducing the commercial value. In contrast, in the shaped article molded from the polyester-based resin composition of the present invention, the gas barrier properties can be improved, and simultaneously, the darkening of thick portion can be avoided, thereby enhancing the commercial value of the shaped article.

In a relatively thin shaped article such as film and a thin-wall packaging material fabricated from the thin shaped article, the darkening may not be noticed by naked eye even when produced from a resin composition suffering from the darkening due to the deposition of antimony. However, these thin shaped article and thin-wall packaging material are generally wound-up to roll or stacked for distribution. Therefore, if produced from a resin material not reduced in its darkening, the wound-up roll and the stacked packaging material present darkened appearance to greatly reduce their commercial value. In contrast, since the darkening is significantly reduced in the polyester-based resin composition of the present invention, the appearance of the wound-up roll and the stacked packaging material presents substantially no darkening. Thus, the commercial value of shaped article and packaging container is greatly enhanced by the present invention.

The polyester-based resin composition may be produced by a method known in the polymer art. For example, the polyamide resin (A) and the polyester resin (B) are dry-blended in a tumbler, a V-type blender, a Herschel mixer, etc., and then melt-blended once or more in a single screw extruder, a twin screw extruder, a kneader, etc., thereby preparing the melt blend (C). If desired, the melt blend (C) prepared in the above manner may be solid-phase polymerized. After adding the optional additional resin and/or additive, the polyester-based resin composition of the present invention is obtained. The shaped article or the packaging container of the present invention may be produced from the polyester-based resin composition thus prepared by using an injection molding machine, a sheet-forming machine, a film-forming machine, etc. Alternatively, the shaped article or the packaging container can be produced directly from a dry blend of the polyamide resin (A) and the polyester resin (B) by using the machines mentioned above without through a step for preparing the melt blend. It should be noted that the polyester-based resin composition and the shaped article and packaging container made thereof can be produced by other methods known in the art without limited to those mentioned above.

The blending temperature for preparing the polyester-based resin composition and the molding temperature for producing the shaped article and the packaging container are not specifically limited as far as the temperature is higher than the melting temperatures of the polyamide resin (A) and the polyester resin (B), and simultaneously, the temperature allows the shaped article and the packaging container to have sufficiently high mechanical properties. For example, the blending temperature or the molding temperature is 240 to 310° C., preferably 260 to 300° C., and more preferably 270 to 290° C.

The shaped article and the packaging container of the present invention are excellent in gas barrier properties and highly, clear in its appearance with little darkening, and therefore, are suitable for preserving liquid foodstuffs, high moisture foodstuffs and low moisture foodstuffs. The liquid foodstuffs may include beverages such as carbonated drink, juice, water, milk, Japanese sake, whisky, Japanese spirits, coffee, tea, jelly drink, and health drink; seasonings such as flavoring liquid, Worcester sauce, soybean sauce, dressing, liquid stock, mayonnaise, soybean paste, and grated spice; paste foodstuffs such as jam, cream, and chocolate paste; and liquid processed foodstuffs such as liquid soup, boiled meat and vegetable, pickles, and stew. The high moisture foodstuffs may include fresh or boiled noodles such as wheat noodle and ramen noodle; non-cooked rice such as polished rice, moisture-controlled rice and washing-free rice; cooked rice; processed rice such as cooked rice with various ingredients, cooked rice with red beans, and rice gruel; and seasoning powders such as soup powder and stock powder. The low moisture foodstuffs may include dried vegetables, coffee beans, coffee powders, tea leaves, and cookies made of grains. In addition, the shaped article and the packaging container of the present invention are suitable for preserving solid or liquid chemicals such as herbicide and pesticide, liquid or paste medicines, cosmetic lotions, cosmetic creams, cosmetic milky lotions, cosmetic hair stuffs, hair dyes, shampoos, soaps, detergents, etc.

The present invention will be explained in more detail by reference to the following examples which should not be construed to limit the scope of the present invention. In the following examples and comparative examples, the evaluations were carried out by the following methods.

Evaluation Methods (1) Relative Viscosity

Into 100 ml of a 96% sulfuric acid, 1 g of an accurately weighed polyamide was dissolved under stirring at 20 to 30° C. Immediately after completely dissolved, 5 ml of the solution was put into a Cannon-Fenske viscometer and allowed to stand in a thermostat at 25° C. for 10 min, and then the falling speed (t) was measured. Separately, the falling speed ($t_0$) of the 96% sulfuric acid was measured in the same manner. The relative viscosity was calculated from the following equation:

Relative Viscosity=$t/t_0$.

(2) Moisture Content (% by mass)

The amount of water was determined by using a Karl Fischer trace water microanalizer (CA-05 model) and a vaporizer (VA-05 model) available from Mitsubishi Chemical Corporation under vaporizing conditions of heating at the melting point for 30 min. The moisture content was calculated from the result.

(3) Antimony Concentration

A polyester resin sample was wet-ashed in a wet ashing apparatus using sulfuric acid or nitric acid. The antimony content in the ashed sample was determined by an atomic absorption spectrometry. The antimony concentration of the polyester resin was calculated from the result.

(4) Lightness

As a measure for evaluating the extent of darkening of a shaped article and a packaging container, the lightness (L value) of a 2-mm thick plate molded by injection molding was measured by a transmission method according to JIS K7105. Smaller the lightness, larger the extent of darkening.

As the apparatus for measuring the lightness, a color difference meter (COH-300A Model) available from Nippon Denshoku Kogyo Co., Ltd. was used.

(5) Oxygen Permeability

The oxygen permeability was measured according to ASTM D3985 using OX-TRAN 10/50A manufactured by Modern Controls Co., Ltd. under the conditions of 23° C., 100% relative humidity (inside a shaped article and a packaging container) and 50% relative humidity (surrounding atmosphere).

In Tables 1 to 3, the oxygen permeability of a bottle sample was expressed by a unit of ml/bottle·day·0.21MPa and expressed by a unit of ml/pkg·day·0.21 MPa for a tray sample.

(6) Appearance

The appearance of a test bottle or tray made of a polyester-based resin composition was compared with that of a reference bottle or tray made of only the same polyester resin as contained in the polyester-based resin composition. When the test bottle or tray presented a clear appearance comparable to that of the reference bottle or tray, the appearance was rated as "good," while rated as "poor" when the test bottle presented a darkened appearance at the mouthpiece portion and the bottom portion or the test tray presented a darkened appearance at the flange portion and the bottom portion.

EXAMPLE 1

A polyamide MXD6 (hereinafter referred to as "PA1"; water content: 0.03% by mass; relative viscosity: 2.60; phosphorus concentration: 150 ppm) prepared by the polymerization of adipic acid and m-xylylene diamine using sodium hypophosphite, and poly(ethylene terephthalate) pellets (hereinafter referred to as "PET1"; available from Kanebo Gosen Co., Ltd. under EFS7 grade; antimony concentration: 196 ppm) were blended in a tumbler in a blending ratio of 10/90 (PA1/PET1 by mass).

The blend was molded into a 2-mm thick plate under the conditions of 270 to 280° C. cylinder temperature and 14° C. die temperature by using an injection molding machine (M150AII-SJ manufactured by Meiki Seisakusho Co., Ltd.). The lightness of the plate is shown in Table 1.

Separately, the blend was molded into a bottle. The blend was made into a parison of 96 mm in length, 4.5 mm in thickness and 24 mm in outer diameter by using an injection molding machine (M200PDM-MJ manufactured by Meiki Seisakusho Co., Ltd.) under the following conditions:

Temperature of injection cylinder: 265 to 285° C.,

Temperature of resin channel of die: 275° C., and

Temperature of die cooling water:10° C.

The parison was heated to 95 to 101° C. by an infrared heater and biaxially stretch-blown into a 500-ml bottle of 223 mm in height, 65 mm in barrel diameter, 1.5 to 3 mm in mouthpiece thickness and 0.5 to 4 mm in bottom thickness. The oxygen permeability and the result of appearance evaluation are shown in Table 1.

EXAMPLE 2

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing the blending ratio (PA1/PET1 by mass) to 15/85. The lightness of the plate, and the oxygen permeability and the result of appearance evaluation of the bottle are shown in Table 1.

EXAMPLE 3

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing PA1 to a polyamide MXD6 (hereinafter referred to as "PA2") having a water content of 0.03% by mass, a relative viscosity of 2.65 and a phosphorus atom concentration of 100 ppm (from sodium hypophosphite). The lightness of the plate, and the oxygen permeability and the result of appearance evaluation of the bottle are shown in Table 1.

EXAMPLE 4

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing PA1 to a polyamide MXD6 (hereinafter referred to as "PA3") having a water content of 0.02% by mass, a relative viscosity of 2.55 and a phosphorus concentration of 5 ppm (from sodium hypophosphite). The lightness of the plate, and the oxygen permeability and the result of appearance evaluation of the bottle are shown in Table 1.

EXAMPLE 5

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 4 except for changing the blending ratio (PA3/PET1 by mass) to 30/70. The lightness of the plate, and the oxygen permeability and the result of appearance evaluation of the bottle are shown in Table 1.

EXAMPLE 6

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing PA1 to a polyamide MXD6 (hereinafter referred to as "PA4") having a water content of 0.03% by mass, a relative viscosity of 2.50 and a phosphorus concentration of zero (no phosphorus compound was used in the preparation of PA4). The lightness of the plate, and the oxygen permeability and the result of appearance evaluation of the bottle are shown in Table 1.

EXAMPLE 7

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing PA1 to a polyamide MXD6 (hereinafter referred to as "PA5") having a water content of 0.03% by mass, a relative viscosity of 2.10 and a phosphorus concentration of 190 ppm (from magnesium hypophosphite). The lightness of the plate, and the oxygen permeability and the result of appearance evaluation of the bottle are shown in Table 1.

EXAMPLE 8

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing PET1 to an isophthalic acid-modified poly(ethylene terephthalate) (hereinafter referred to as "PET2") which was prepared by a direct esterification of a dicarboxylic acid component of terephthalic acid/isophthalic acid=98/2 (by mol) and ethylene glycol using antimony trioxide. The antimony concentration of PET2 was 230 ppm. The lightness of the plate, and the oxygen permeability and the result of appearance evaluation of the bottle are shown in Table 1.

EXAMPLE 9

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 4 except for changing PET1 to PET2. The lightness of the plate, and the oxygen permeability and the result of appearance evaluation of the bottle are shown in Table 1.

COMPARATIVE EXAMPLE 1

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing PA1 to a polyamide MXD6 (hereinafter referred to as "PA6") having a water content of 0.05% by mass, a relative viscosity of 2.10 and a phosphorus concentration of 350 ppm (from sodium hypophosphite). The lightness of the plate, and the oxygen permeability and the result of appearance evaluation of the bottle are shown in Table 2.

COMPARATIVE EXAMPLE 2

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for changing PA1 to a polyamide MXD6 (hereinafter referred to as "PA7") having a water content of 0.03% by mass, a relative viscosity of 2.40 and a phosphorus concentration of 290 ppm (from sodium hypophosphite). The lightness of the plate, and the oxygen permeability and the result of appearance evaluation of the bottle are shown in Table 2.

COMPARATIVE EXAMPLE 3

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Comparative Example 1 except for changing the blending ratio (PA6/PET1 by mass) to 30/70. The lightness of the plate, and the oxygen permeability and the result of appearance evaluation of the bottle are shown in Table 2.

COMPARATIVE EXAMPLE 4

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for using only PET1. The lightness of the plate, and the oxygen permeability and the result of appearance evaluation of the bottle are shown in Table 2.

COMPARATIVE EXAMPLE 5

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for using only PET2. The lightness of the plate, and the oxygen permeability and the result of appearance evaluation of the bottle are shown in Table 2.

COMPARATIVE EXAMPLE 6

A 2-mm thick plate and a 500-ml bottle of 223 mm in height, 65 mm in barrel diameter, 1.5 to 3 mm in mouthpiece thickness and 0.5 to 4 mm in bottom thickness were molded in the same manner as in Example 1 except for using only a poly(ethylene terephthalate) (hereinafter referred to as "PET3") which was prepared by a direct esterification of terephthalic acid and ethylene glycol using antimony trioxide. The antimony concentration of PET3 was 480 ppm. The lightness of the plate, and the oxygen permeability and the result of appearance evaluation of the bottle are shown in Table 2.

TABLE 1

|  | Examples |  |  |  |  |
|---|---|---|---|---|---|
|  | 1 | 2 | 3 | 4 | 5 |
| Polyamide Resin (A) Content C (% by mass) |  |  |  |  |  |
| PA1 | 10 | 15 | — | — | — |
| PA2 | — | — | 10 | — | — |
| PA3 | — | — | — | 10 | 30 |
| PA4 | — | — | — | — | — |
| PA5 | — | — | — | — | — |
| Phosphorus concentration P (ppm) | 150 | 150 | 100 | 5 | 5 |
| Polyester Resin (B) Content (% by mass) |  |  |  |  |  |
| PET1 | 90 | 85 | 90 | 90 | 70 |
| PET2 | — | — | — | — | — |
| Antimony concentration (ppm) | 196 | 196 | 196 | 196 | 196 |
| P × C/100 Lightness of plate | 15 | 22.5 | 10 | 0.5 | 1.5 |
| $Y^{a)}$ | 95 | 90 | 95 | 95 | 95 |
| $X^{b)}$ | 95 | 95 | 95 | 95 | 95 |
| Y/X × 100 Bottle | 100 | 95 | 100 | 100 | 100 |
| Oxygen permeability$^{c)}$ | 0.12 | 0.09 | 0.12 | 0.12 | 0.05 |
| Appearance | good | good | good | good | good |

|  | Examples |  |  |  |
|---|---|---|---|---|
|  | 6 | 7 | 8 | 9 |
| Polyamide Resin (A) Content C (% by mass) |  |  |  |  |
| PA1 | — | — | 10 | — |
| PA2 | — | — | — | — |
| PA3 | — | — | — | 10 |
| PA4 | 10 | — | — | — |
| PA5 | — | 10 | — | — |
| Phosphorus concentration P (ppm) | 0 | 190 | 150 | 5 |
| Polyester Resin (B) Content (% by mass) |  |  |  |  |
| PET1 | 90 | 90 | — | — |
| PET2 | — | — | 90 | 90 |
| Antimony concentration (ppm) | 196 | 196 | 230 | 230 |
| P × C/100 Lightness of plate | 0 | 19 | 15 | 0.5 |
| $Y^{a)}$ | 95 | 92 | 82 | 83 |
| $X^{b)}$ | 95 | 95 | 83 | 83 |
| Y/X × 100 Bottle | 100 | 97 | 99 | 100 |
| Oxygen permeability$^{c)}$ | 0.12 | 0.12 | 0.13 | 0.13 |
| Appearance | good | good | good | good |

$^{a)}$Lightness of a 2-mm thick plate made of a polyester/polyamide resin composition.
$^{b)}$Lightness of a 2-mm thick plate made of a polyester resin composition.
$^{c)}$Unit: ml/bottle·day·0.21 MPa

TABLE 2

|  | Comparative Examples |  |  |  |  |  |
|---|---|---|---|---|---|---|
|  | 1 | 2 | 3 | 4 | 5 | 6 |
| Polyamide Resin (A) Content C (% by mass) |  |  |  |  |  |  |
| PA6 | 10 | — | 30 | — | — | — |
| PA7 | — | 10 | — | — | — | — |
| Phosphorus concentration P (ppm) | 350 | 290 | 350 | — | — | — |
| Polyester Resin (B) Content (% by mass) |  |  |  |  |  |  |
| PET1 | 90 | 90 | 70 | 100 | — | — |
| PET2 | — | — | — | — | 100 | — |
| PET3 | — | — | — | — | — | 100 |
| Antimony concentration (ppm) | 196 | 196 | 196 | 196 | 230 | 480 |
| P × C/100 Lightness of plate | 35 | 29 | 105 | 0 | 0 | 0 |
| $Y^{a)}$ | 80 | 81 | 79 | — | — | — |
| $X^{b)}$ | 95 | 95 | 95 | 95 | 83 | 91 |
| Y/X × 100 Bottle | 84 | 85 | 83 | — | — | — |
| Oxygen permeability$^{c)}$ | 0.12 | 0.12 | 0.06 | 0.36 | 0.38 | — |
| Appearance | poor | poor | poor | — | — | — |

$^{a)}$Lightness of a 2-mm thick plate made of a polyester/polyamide resin composition.
$^{b)}$Lightness of a 2-mm thick plate made of a polyester resin composition.
$^{c)}$Unit: ml/bottle·day·0.21 MPa The results of Examples 1 to 9 show that the darkening due to the deposition of antimony metal in the polyester resin was less observed in the polyester-based resin compositions of Examples 1 to 9 as evidenced by the lightness of the plates, because the balance between the polyamide resin content and the phosphorus concentration were regulated within the limited range as described above in detail. The bottles of Examples 1 to 9 retained a good appearance which was attained by the sole use of a polyester resin as shown in Comparative Examples 4 and 5, while simultaneously being improved in the gas barrier properties. The results of Examples 7 to 9 show that the darkening due to the deposition of antimony metal in the polyester resin can be effectively prevented by regulating the balance between the polyamide resin content and the phosphorus concentration within the limited range even when the type of the phosphorus compound and/or the type of the polyester resin are changed.

In contrast, in Comparative Examples 1 to 3, where the balance between the polyamide resin content and the phosphorus concentration was outside the range of the present invention, the darkening due to the deposition of antimony metal in the polyester resin was extremely increased as evidenced by the lightness of the plates. Although the bottles were improved in the gas barrier properties by the blended polyamide resin, the bottles presented poor appearance because of the marked darkening at relatively thick portions such as mouthpiece portion and bottom portion.

EXAMPLE 10

The same PA1/PET1 blend as prepared in Example 1 was made into a sheet of 750 μm in thickness and 40 cm in width by using a sheet-forming machine constructed by an extruder, a feed block, a T-die, a quenching roll, a winder, etc. under the conditions of an extrusion temperature of 275° C. and a take-up speed of 4 m/min. The lightness of the sheet is shown in Table 3. The resultant sheet was formed into a square tray having a 130 mm×70 mm opening and a 25 mm height by a vacuum-pressure forming machine. The oxygen permeability and the result of the appearance evaluation are shown in Table 3.

COMPARATIVE EXAMPLE 7

The same PA7/PET1 blend as prepared in Comparative Example 2 was formed into a sheet and a tray in the same manner as in Example 10. The lightness of the sheet, and the oxygen permeability and the result of the appearance evaluation of the tray are shown in Table 3.

COMPARATIVE EXAMPLE 8

PET1 was formed into a sheet and a tray in the same manner as in Example 10. The lightness of the sheet, and the oxygen permeability and the result of the appearance evaluation of the tray are shown in Table 3.

TABLE 3

|  | Example | Comparative Examples | |
| --- | --- | --- | --- |
|  | 10 | 7 | 8 |
| Polyamide Resin (A) Content C (% by mass) | | | |
| PA1 | 10 | — | — |
| PA7 | — | 10 | — |
| Phosphorus concentration P (ppm) | 150 | 290 | — |
| Polyester Resin (B) Content (% by mass) | | | |
| PET1 | 90 | 90 | 100 |
| Antimony concentration (ppm) | 196 | 196 | 196 |
| P × C/100 | 15 | 29 | — |
| Lightness of plate | | | |
| $Y^{a)}$ | 95 | 81 | — |
| $X^{b)}$ | 95 | 95 | 95 |
| Y/X × 100 | 100 | 85 | — |
| Lightness of sheet | 95 | 82 | 95 |
| Tray | | | |
| Oxygen permeability$^{c)}$ | 0.07 | 0.07 | 0.09 |
| Appearance | good | poor | good |

$^{a)}$Lightness of a 2-mm thick plate made of a polyester/polyamide resin composition.
$^{b)}$Lightness of a 2-mm thick plate made of a polyester resin composition.
$^{c)}$Unit: ml/pkg · day · 0.21 MPa The results of Example 10 and Comparative Examples 7 and 8 show that the tray of Example 10, where the balance between the polyamide resin content and the phosphorus concentration were regulated within the limited range as described above in detail, was improved in gas barrier properties as compared with the tray of Comparative Example 8 which was made only of PET1. In addition, the tray of Example 10 was substantially free from the darkening due to the deposition of antimony metal in the polyester resin in spite of blending the polyamide resin, and presented clear appearance comparable to that of the tray made only of PET1. Thus, the tray of Example 10 is of high commercial value.

In contrast, in Comparative Example 7, where the balance between the polyamide resin content and the phosphorus concentration was outside the range of the present invention, although the gas barrier properties were improved, the darkening due to the deposition of antimony metal in the polyester resin was extremely increased and the tray presented poor appearance because of the darkening at the flange portion and the bottom portion.

As described in detail, the polyester-based resin composition of the present invention which is prepared by melt-blending a polyamide resin and a polyester resin, and the shaped article and packaging container made thereof show excellent gas barrier properties and present excellent appearance with little darkening. Thus, the present invention provides the polyester-based resin composition and its shaped article and packaging container with commercial and industrial value higher than those known in the art.

What is claimed is:

1. A polyester-based resin composition comprising a melt blend (C) consisting of 3 to 40% by mass of a polyamide resin (A) which contains phosphorus compound, a concentration of the phosphorus compound in the polyamide resin (A), in terms of phosphorus atom, being 200 ppm or less, and which is prepared by a polycondensation of a diamine component containing 70 mol % or more of m-xylylene diamine and a dicarboxylic acid component containing 70 mol % or more of adipic acid and 97 to 60% by mass of a polyester resin (B) which contains an antimony compound used as a polycondensation catalyst in an amount of 50 to 400 ppm in terms of antimony atom, the polyester-based resin composition satisfying the following formulas 1 and 2:

$$P \times C/100 \leq 25 \tag{1}$$

$$Y/X \times \geq 90 \tag{2}$$

wherein P is a concentration, ppm, of the phosphorus compound in the polyamide resin (A) in terms of phosphorus atom; C is a content, % by mass, of the polyamide resin (A) in the melt blend (C); X is a lightness of a 2-mm thick plate which is molded only from the polyester resin (B); and Y is a lightness of a 2-mm thick plate which is molded from the melt blend (C).

2. The polyester-based resin composition according to claim 1, wherein the polyamide resin (A) is a polyamide which is prepared by polycondensing a diamine component containing 90 mol % or more of m-xylylene diamine and a dicarboxylic acid component containing 90 mol % or more of adipic acid.

3. The polyester-based resin composition according to claim 1, wherein the phosphorus compound contained in the polyamide resin (A) is an alkali metal hypophosphite or an alkaline earth metal hypophosphite.

4. The polyester-based resin composition according to claim 1, wherein the polyester resin (B) is a polyester resin which is prepared by polycondensing a dicarboxylic acid component containing 70 mol % or more of terephthalic acid and a diol component containing 70 mol % or more of ethylene glycol.

5. The polyester-based resin composition according to claim 1, wherein the polyester resin (B) is a polyester which is prepared by polycondensing a dicarboxylic acid component containing 1 to 10 mol % of isophthalic acid and 99 to 90 mol % of terephthalic acid and a diol component containing 70 mol % or more of ethylene glycol.

6. A shaped article having at least one layer which is made of the polyester-based resin composition as defined in claim 1.

7. The shaped article according to claim 6, wherein a thickness of the layer made of the polyester-based resin composition is 0.003 to 5 mm.

8. The shaped article according to claim 6, which is made into a form of film or sheet.

9. A packaging container which is molded from the polyester-based resin composition as defined in claim 1.

10. The packaging container according to claim 9, which is a hollow shaped article having a mouthpiece portion of 2 mm thick or more.

11. A packaging container, which is produced by injection-molding the polyester-based resin composition as defined in any one of claims 1 to 5 into a parison and then blow-molding the parison.

12. The polyester-based resin composition according to claim 1, wherein the phosphorus compound is an alkali metal- or alkaline earth metal-containing phosphorus compound.

13. The polyester-based resin composition according to claim 1, wherein said phosphorus compound is selected from the group consisting of phosphates, hypophosphites and phosphites or sodium, magnesium and calcium.

14. The polyester-based resin composition according to claim 1, wherein the polyamide resin (A) contains a concentration of phosphorus compound of at least 5 ppm in terms of phosphorus atom.

15. The polyester-based resin composition according to claim 1, wherein the polyamide resin (A) contains the phosphorus compound in a concentration, in terms of phosphorus atom, of 160 ppm or less.

16. The polyester-based resin composition according to claim 1, wherein the polyamide resin (A) contains the phosphorus compound in a concentration, in terms of phosphorus atom, of 100 ppm or less.

17. The polyester-based resin composition according to claim 1, wherein $P \times C/100 \leq 20$.

18. The polyester-based resin composition according to claim 1, wherein $P \times C/100 \leq 17$.

* * * * *